(12) United States Patent
Kitagawa et al.

(10) Patent No.: US 10,893,922 B2
(45) Date of Patent: Jan. 19, 2021

(54) ELECTRIC APPARATUS UNIT

(71) Applicant: PANASONIC INTELLECTUAL PROPERTY MANAGEMENT CO., LTD., Osaka (JP)

(72) Inventors: Tadanobu Kitagawa, Shiga (JP); Seiichi Iwao, Shiga (JP); Norihiro Iwamura, Shiga (JP); Mami Tsutsui, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 238 days.

(21) Appl. No.: 15/721,246

(22) Filed: Sep. 29, 2017

(65) Prior Publication Data

US 2018/0021117 A1    Jan. 25, 2018

Related U.S. Application Data

(63) Continuation of application No. PCT/JP2016/001677, filed on Mar. 23, 2016.

(30) Foreign Application Priority Data

Apr. 6, 2015  (JP) ................... 2015-078057

(51) Int. Cl.
*A61C 17/22* (2006.01)
*H02J 7/00* (2006.01)
(Continued)

(52) U.S. Cl.
CPC ............ *A61C 17/224* (2013.01); *A45D 26/00* (2013.01); *A61C 17/0202* (2013.01);
(Continued)

(58) Field of Classification Search
CPC ... A61C 17/224; A61C 17/0202; A61C 17/22; A61C 17/02; A61C 17/34;
(Continued)

(56) References Cited

U.S. PATENT DOCUMENTS 5,561,881 A * 10/1996 Klinger .............. A46B 15/0002
15/105
6,265,789 B1 * 7/2001 Honda .................... H01F 38/14
307/33
(Continued)

FOREIGN PATENT DOCUMENTS

JP   H02-044255 U    3/1990
JP      05023222 A *  2/1993
(Continued)

OTHER PUBLICATIONS

Extended European Search Report dated Mar. 16, 2018 for the related European Patent Application No. 16776268.1.
(Continued)

*Primary Examiner* — Richard Isla
*Assistant Examiner* — Dung V Bui
(74) *Attorney, Agent, or Firm* — McDermott Will & Emery LLP

(57) ABSTRACT

An electric apparatus unit comprises electric apparatus and charging stand. Electric apparatus includes rechargeable battery, a driver that drives through electric power supplied from rechargeable battery and power receiver that supplies the electric power to rechargeable battery. Charging stand includes power transmission coil that supplies electric power to power receiver and support that supports electric apparatus.

11 Claims, 12 Drawing Sheets

(51) Int. Cl.

| | | |
|---|---|---|
| *H02J 50/10* | (2016.01) | |
| *A61C 17/02* | (2006.01) | |
| *B26B 19/38* | (2006.01) | |
| *H02J 7/02* | (2016.01) | |
| *A61C 17/34* | (2006.01) | |
| *H02J 50/12* | (2016.01) | |
| *A45D 26/00* | (2006.01) | |

(52) U.S. Cl.
CPC ............ *A61C 17/22* (2013.01); *A61C 17/34* (2013.01); *A61C 17/3481* (2013.01); *B26B 19/38* (2013.01); *H02J 7/0044* (2013.01); *H02J 7/025* (2013.01); *H02J 50/10* (2016.02); *H02J 50/12* (2016.02); *A45D 2026/008* (2013.01); *A61C 17/3418* (2013.01); *B26B 19/3873* (2013.01)

(58) Field of Classification Search
CPC ............ A61C 17/3481; A61C 17/3418; H02J 7/0044; H02J 7/00; H02J 7/025; H02J 50/10; H02J 50/12; A45D 26/00; A45D 2026/008; B26B 19/38; B26B 19/3873
USPC ........................................................ 320/115
See application file for complete search history.

(56) References Cited

U.S. PATENT DOCUMENTS

| | | | | |
|---|---|---|---|---|
| 6,798,169 | B2* | 9/2004 | Stratmann | A61C 17/22 320/114 |
| 2002/0116775 | A1* | 8/2002 | Wong | A61C 17/22 15/22.1 |
| 2005/0104556 | A1* | 5/2005 | Pfenniger | A61C 17/22 320/108 |
| 2006/0197495 | A1* | 9/2006 | Bumiller | H01R 13/6675 320/111 |
| 2007/0273331 | A1* | 11/2007 | Cross | A61C 17/224 320/115 |
| 2011/0068738 | A1 | 3/2011 | Gomi et al. | |
| 2013/0125327 | A1* | 5/2013 | Schmid | A46B 9/04 15/105 |
| 2013/0257369 | A1* | 10/2013 | Nazaroff | A61C 17/224 320/108 |
| 2014/0199651 | A1* | 7/2014 | Adachi | A61C 17/20 433/27 |
| 2015/0088538 | A1* | 3/2015 | Dykes | G16H 50/20 705/2 |

FOREIGN PATENT DOCUMENTS

| | | |
|---|---|---|
| JP | 5-234763 A | 9/1993 |
| JP | H07-320964 A | 12/1995 |
| JP | 10-005045 A | 1/1998 |
| JP | 11-056879 A | 3/1999 |
| JP | 2000-069685 A | 3/2000 |
| JP | 2000-139033 A | 5/2000 |
| JP | 2003-047180 A | 2/2003 |
| JP | 2011-120332 A | 6/2011 |
| JP | 2011-143039 A | 7/2011 |
| JP | 2014-072612 A | 4/2014 |

OTHER PUBLICATIONS

International Search Report and Written Opinion issued in International Patent Application No. PCT/JP2016/001677, dated Jun. 7, 2016; with partial English translation.

* cited by examiner

FIG. 3
FIG. 4
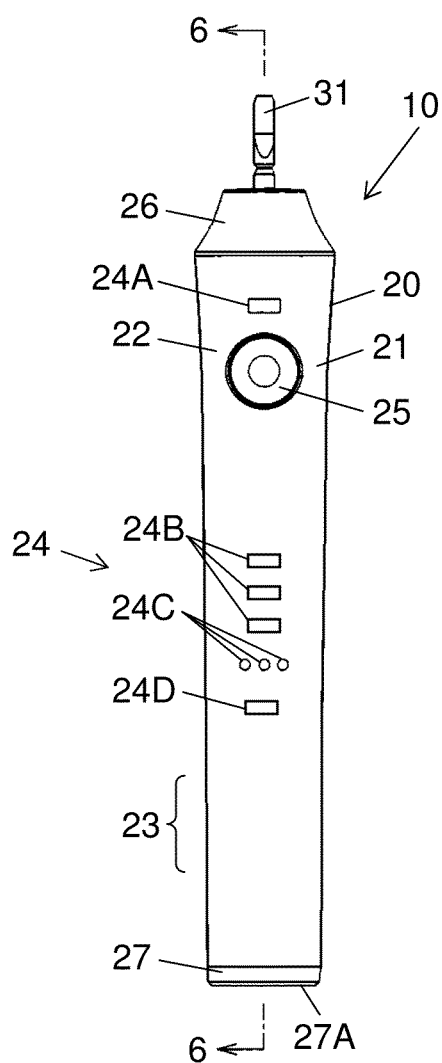
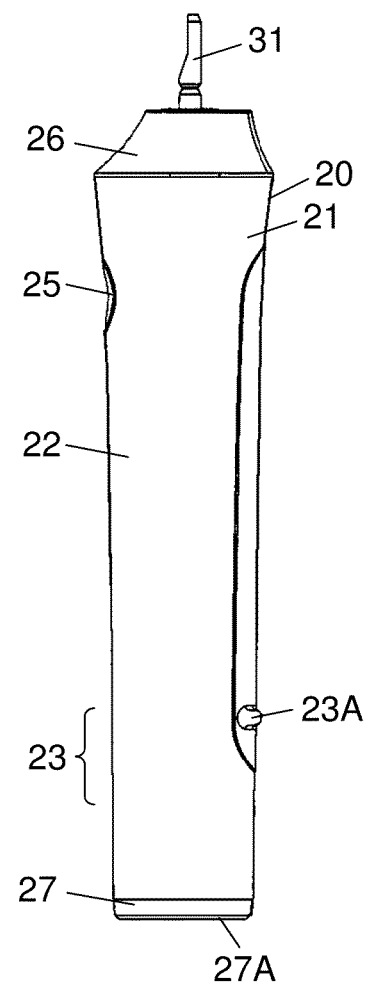

FIG. 7
FIG. 8
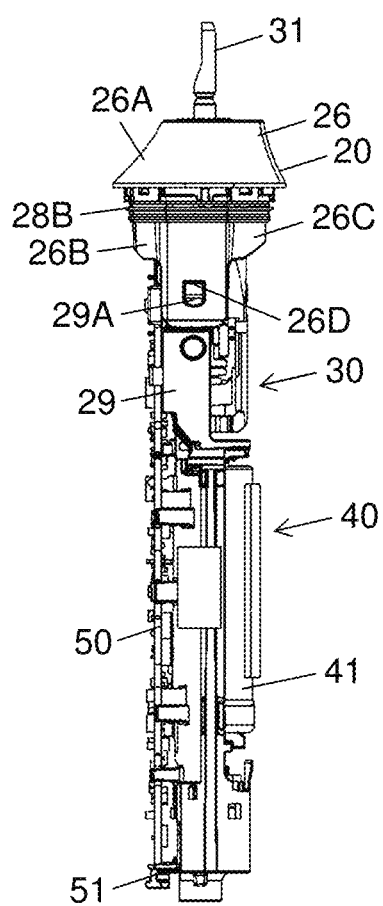
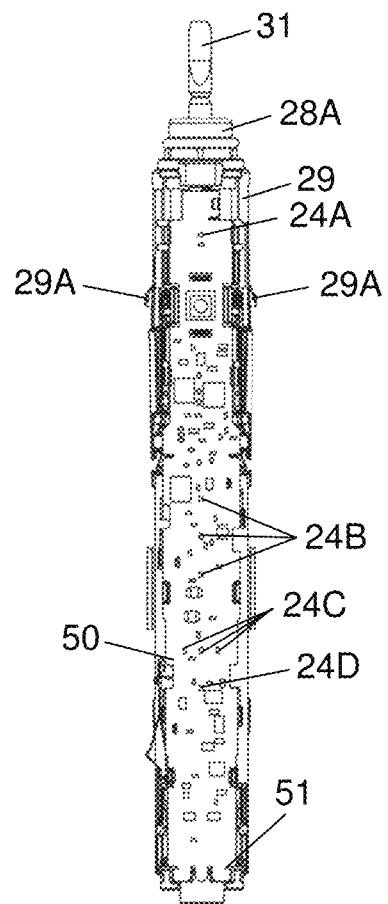

ELECTRIC APPARATUS UNIT

RELATED APPLICATIONS

This application is a Continuation of International Patent Application No. PCT/JP2016/001677, filed on Mar. 23, 2016, which in turn claims the benefit of Japanese Application No. 2015-078057, filed on Apr. 6, 2015, the entire disclosures of which Applications are incorporated by reference herein.

TECHNICAL FIELD

The present invention relates to an electric apparatus unit which comprises an electric apparatus and a charging stand.

BACKGROUND ART

An electric toothbrush and a charging stand for the electric toothbrush are known as an example of a conventional electric apparatus unit. Patent Literature 1 discloses an example of such conventional electric apparatus unit. According to an electric apparatus unit in Patent Literature 1, an electric toothbrush is set on an installation base through a space surrounded by an arm of a charging stand. The charging stand transmits electric power to the electric toothbrush by way of non-contact power transmission. Thus, a rechargeable battery installed in the electric toothbrush is charged.

However, according to the electric apparatus unit in Patent Literature 1, when the electric toothbrush is set on the installation base, moisture between a bottom surface of the electric toothbrush and the installation base hardly evaporates. Hereinafter, an electric toothbrush will be described as an example of a small electric apparatus, and problems of the electric tooth brush will be discussed. However, other electric apparatuses such as electric razors have the same problem.

CITATION LIST

Patent Literature

PTL 1: Japanese Patent Application Laid-Open No. 7-320964

SUMMARY OF THE INVENTION

The present invention provides an electric apparatus unit in which moisture adhered to an electric apparatus or an installation stand (a charging stand) evaporates.

More specifically, an electric apparatus unit according to an example of an exemplary embodiment of the present invention includes: an electric apparatus that includes a rechargeable battery, a driver that drives through power supplied from the rechargeable battery, and a secondary power supply unit that supplies the power to the rechargeable battery; and a charging stand that includes a primary power supply unit that supplies the power to the secondary power supply unit, and a support that supports the electric apparatus.

Such configuration as described above makes it possible to easily evaporate moisture on the electric apparatus or an installation base (a charging stand).

BRIEF DESCRIPTION OF DRAWINGS

FIG. 3 is a front view of the electric toothbrush of the electric apparatus unit according to the exemplary embodiment of the present invention.

FIG. 4 is a side view of the electric toothbrush of the electric apparatus unit according to the exemplary embodiment of the present invention.

FIG. 7 is a side view of the electric toothbrush from which a grip and a lower cap of the electric toothbrush of the electric apparatus unit according to the exemplary embodiment of the present invention are detached.

FIG. 8 is a front view of the electric toothbrush from which the grip, an upper cap and the lower cap of the electric toothbrush of the electric apparatus unit according to the exemplary embodiment of the present invention illustrated in FIG. 2 are detached.

DESCRIPTION OF EMBODIMENT

An exemplary embodiment of the present invention will be described below with reference to the drawings. It should be noted that the exemplary embodiment described hereunder does not limit the present invention.

Exemplary Embodiment

A configuration of electric apparatus unit 1 which is an example of the exemplary embodiment of the present invention will be described with reference to FIGS. 1 to 19.

Figure 1:
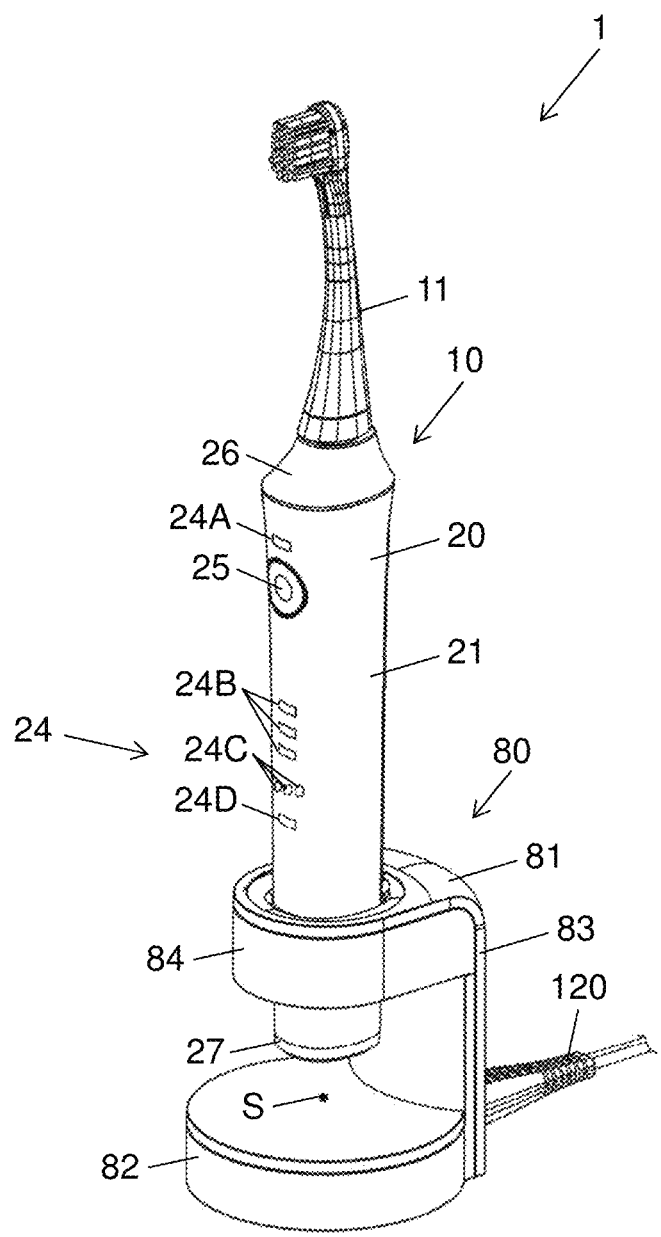
FIG. 1 is a perspective view of an electric apparatus unit according to an exemplary embodiment of the present invention.

As illustrated in FIG. 1, electric apparatus unit 1 according to the present exemplary embodiment includes electric toothbrush 10 which is an electric apparatus, and charging stand 80.

Electric toothbrush 10 includes main body 20 of a columnar shape, and head 11 which is detachably attached to output shaft 31 (see FIG. 2) of driver 30 (see FIG. 6) of main body 20.

Figure 2:
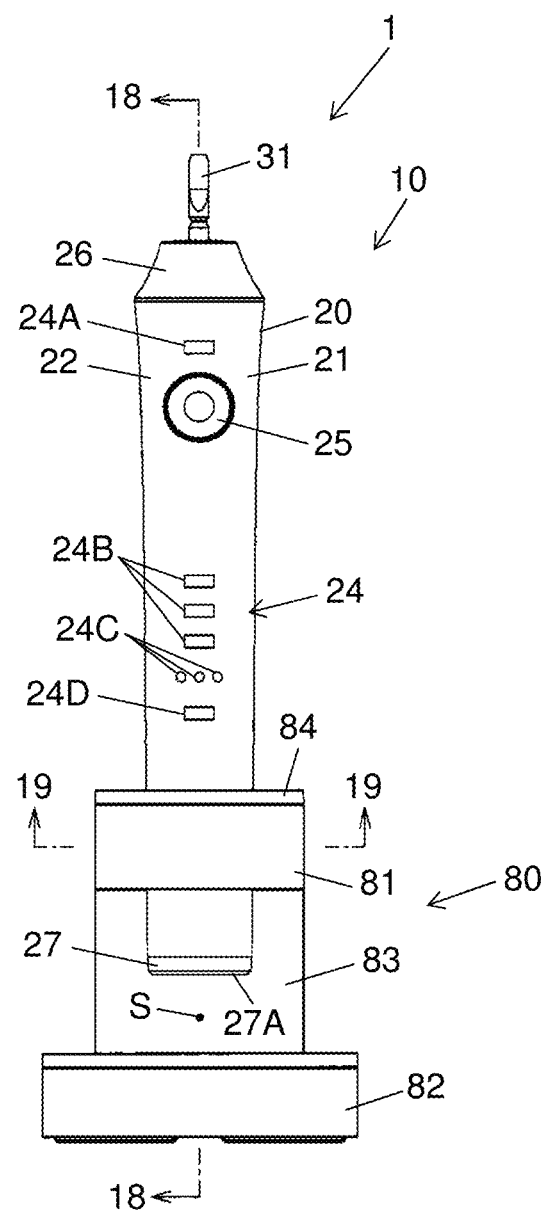
FIG. 2 is a front view of the electric apparatus unit from which a head of an electric toothbrush of the electric apparatus unit according to the exemplary embodiment of the present invention is detached.

As illustrated in FIG. 2, main body 20 includes case 21, display 24 and power button 25. Inside case 21, driver 30, power supply 40, substrate 50, power receiving device 60 and magnetism collecting device 70 are supported by support body 29 and housed as illustrated in FIG. 6.

Figure 19:
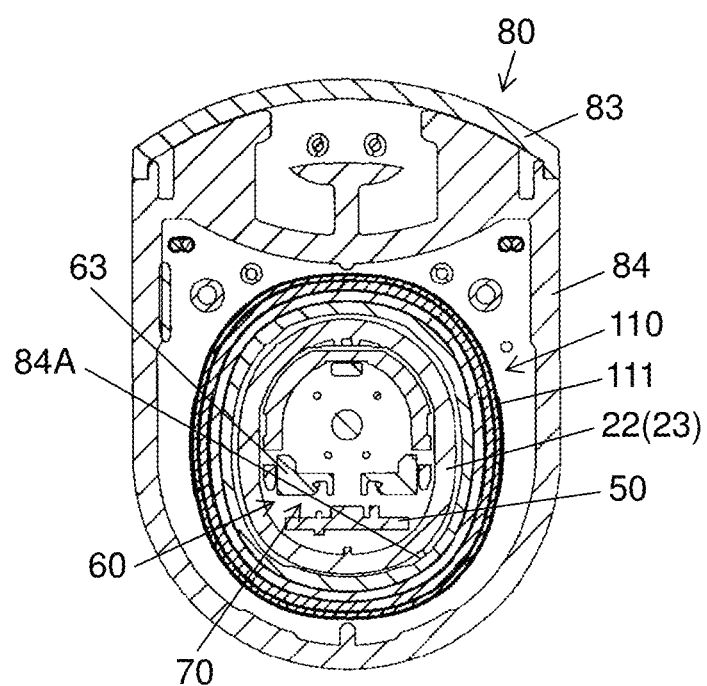
FIG. 19 is a cross-sectional view taken along line 19-19 in FIG. 2.

As illustrated in FIG. 3, case 21 includes hollow grip 22, upper cap 26 that blocks an upper portion of grip 22, and lower cap 27 that blocks a lower portion of grip 22. Grip 22 has a tapered shape whose outer diameter is smaller from upper cap 26 to lower cap 27. As illustrated in FIG. 19, a cross section along a width direction of grip 22 has a substantially elliptical shape.

Figure 5:
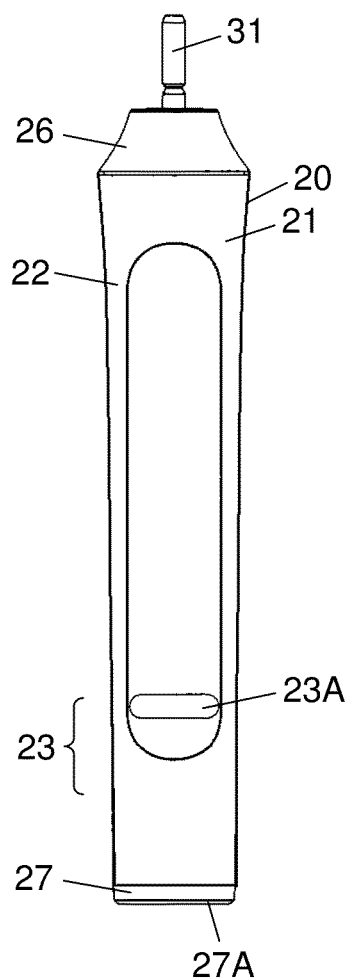
FIG. 5 is a back view of the electric toothbrush of the electric apparatus unit according to the exemplary embodiment of the present invention.

As illustrated in FIGS. 4 and 5, protrusion 23A that protrudes to an outside of grip 22 is formed on a back surface of grip 22. Protrusion 23A extends in a circumferential direction of grip 22. Protrusion 23A is discontinuously disposed in the circumferential direction of the grip 22. Grip 22 includes supported portion 23 which is covered by support 84 of charging stand 80 when a portion below protrusion 23A is supported by charging stand 80 (see FIG. 2). Supported portion 23 is formed such that protrusion 23A is an upper end.

Figure 6:
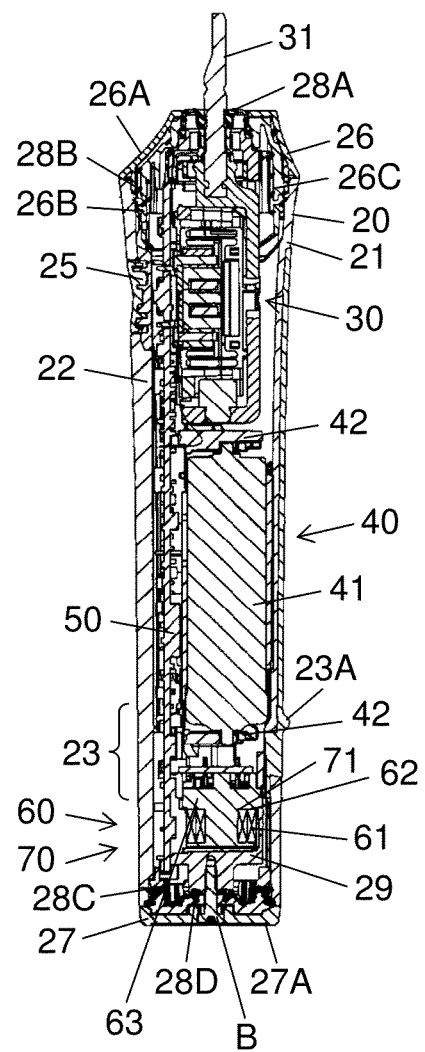
FIG. 6 is a cross-sectional view taken along line 6-6 in FIG. 3.

As illustrated in FIG. 6, upper cap 26 includes top cap 26A, and inner cap 26B which is overlaid on an inner side of top cap 26A. Upper cap 26 is fitted to an upper portion of grip 22.

As illustrated in FIG. 7, inner cap 26B includes coupling portion 26C of a cylindrical shape which protrudes downward. Hole 26D is formed on coupling portion 26C.

As illustrated in FIG. 8, elastic member 28A of a disk shape is attached to an upper surface of upper cap 26, and is disposed to allow output shaft 31 to protrude from elastic member 28A.

As illustrated in FIG. 6, elastic member 28B is disposed between upper cap 26 and an inner circumference of grip 22. As illustrated in FIG. 7, for example, an 0 ring is used for elastic member 28B. Upper cap 26 is attached to support body 29 by fitting, to hole 26D, hook 29A formed on an outer circumference of support body 29.

As illustrated in FIG. 6, lower cap 27 has a double structure. Lower cap 27 is fitted to a lower portion of grip 22. Lower cap 27 is attached to support body 29 by screw B from below. Elastic member 28C is disposed between lower cap 27 and the inner circumference of grip 22. For example, an 0 ring is used for elastic member 28C. Elastic member 28D is disposed between lower cap 27 and a bottom surface of support body 29.

Elastic members 28A to 28D prevent entry of water inside case 21 and transmission of vibration inside main body 20 to case 21. Further, the double structure of upper cap 26 and lower cap 27 prevents entry of water inside case 21 and transmission of vibration inside main body 20 to case 21.

Main body 20 is assembled by inserting support body 29 to which upper cap 26, driver 30, power supply 40, substrate 50 and power receiving device 60 are attached from above of grip 22, and attaching lower cap 27 to grip 22.

As illustrated in FIG. 3, display 24 is attached to main body 20 visibly for a user. Display 24 includes ion display 24A, drive mode display 24B, remaining power display 24C and charging display 24D. Each of displays 24A to 24D is configured by an LED, for example.

Ion display 24A displays that ions are produced at head 11 by way of lighting up. Drive mode display 24B is lighted up according to a vibration type of head 11. The vibration type of head 11 is set according to a drive mode of driver 30 (see FIG. 6). Remaining power display 24C displays an indication corresponding to a voltage of rechargeable battery 41 (see FIG. 6) of power supply 40. Charging display 24D displays that rechargeable battery 41 is being charged by way of lighting up.

As illustrated in FIG. 8, each of displays 24A to 24D is mounted on substrate 50. As illustrated in FIG. 3, a portion of grip 22 which faces each of displays 24A to 24D is formed by using a highly light transmissive material to expose light when each of displays 24A to 24D is lighted up. In this regard, a hole may be formed in grip 22 to expose at least part of each of displays 24A to 24D from a surface of grip 22.

Each of displays 24A to 24D is disposed at a position different from supported portion 23. According to such configuration, even when main body 20 is supported on charging stand 80 as illustrated in FIG. 2, the user can visually check each of displays 24A to 24D. Particularly, charging display 24D can be visually checked, so that the user can learn whether or not charging is being performed.

Power button 25 is attached to main body 20 such that the user can operate power button 25. Power button 25 is attached to main body 20 such that at least part of power button 25 is exposed from the surface of grip 22. When power button 25 is pushed, a drive controller (not illustrated) controls driver 30 (see FIG. 6) based on a set drive mode.

As illustrated in FIG. 6, driver 30 is supported by main body 20 such that output shaft 31 protrudes from an upper portion of case 21. For example, an electric linear actuator is used for driver 30. When driver 30 drives, output shaft 31 vibrates. Thus, head 11 (see FIG. 1) attached to output shaft 31 vibrates.

In this regard, it is also possible to configure driver 30 as an electric motor, and output shaft 31 as an eccentric shaft which is eccentric with respect to a rotation shaft of the electric motor. In this case, the eccentric shaft vibrates as the electric motor drives, and thus vibrate head 11 can be vibrated (see FIG. 1).

Power supply 40 includes rechargeable battery 41. Rechargeable battery 41 is, for example, a lithium-ion battery. Rechargeable battery 41 is supported by sheet metal 42 whose upper end and lower end are supported by support body 29. Substrate 50 is disposed inside grip 22 along the inner circumference of grip 22. Power supply 40 supplies power to driver 30.

Power receiver 61 which is a secondary power supply unit of power receiving device 60 is disposed near bottom surface 27A of grip 22. Power receiver 61 includes power reception coil 62 and magnetism collection coil 71 of magnetism collecting device 70.

Power reception coil 62 and magnetism collection coil 71 are wound around magnetic body core 63 of a bobbin shape. Power reception coil 62 is wound around an outer circumference of magnetism collection coil 71. Resin is attached to ferrite of magnetic body core 63. An insulation tape is wound between magnetism collection coil 71 and power reception coil 62.

Elements of power reception coil 62 and substrate 50 are connected by lead frame 51 illustrated in FIG. 7. Lead frame 51 is disposed at a lower end portion of substrate 50 to support substrate 50.

As illustrated in FIG. 6, inside grip 22, driver 30 is disposed near upper cap 26 and power reception coil 62 is disposed near lower cap 27. Further, power supply 40 is disposed between driver 30 and power reception coil 62.

Figure 9:
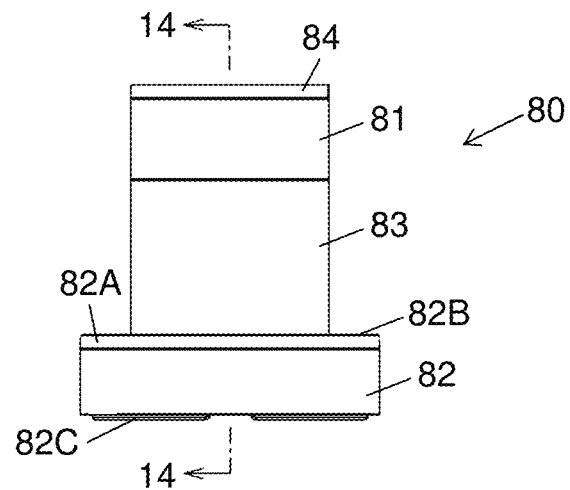
FIG. 9 is a front view of a charging stand of the electric apparatus unit according to the exemplary embodiment of the present invention.
Figure 14:
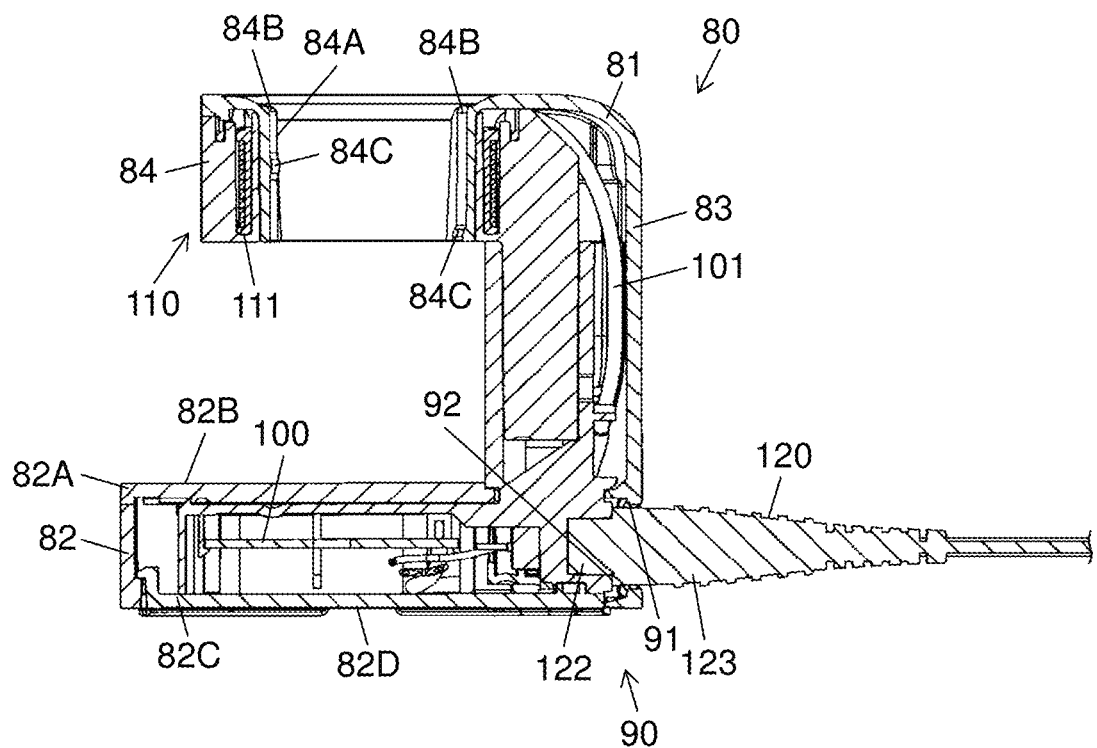
FIG. 14 is a cross-sectional view taken along line 14-14 in FIG. 9.

As illustrated in FIG. 9, charging stand 80 includes case 81, connection portion 90 (see FIG. 10) which is connected with power line 120 (see FIG. 10) for connecting with alternating-current power supply AC (see FIG. 21), and substrate 100 and power transmitting device 110 illustrated in FIG. 14. Substrate 100 and power transmitting device 110 are housed inside case 81.

Case 81 includes base 82 which is installed on an installation surface of furniture or the like, column 83 which extends upward from part of an outer circumference of base 82, and support 84 which protrudes in a horizontal direction from an upper end of column 83.

Figure 10:
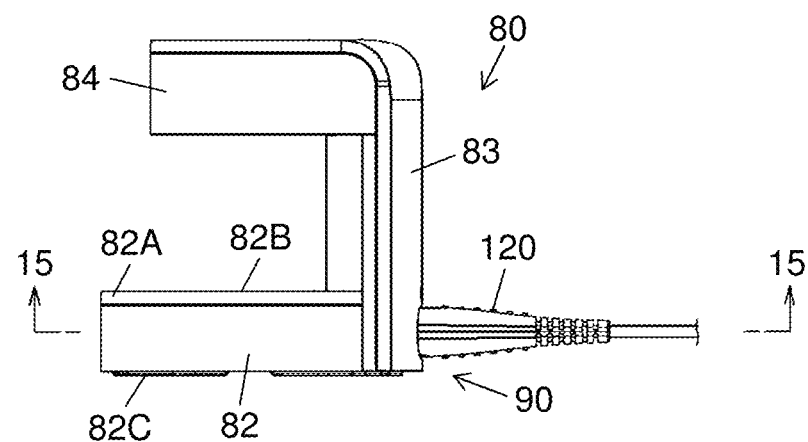
FIG. 10 is a side view of the charging stand of the electric apparatus unit according to the exemplary embodiment of the present invention.

As illustrated in FIG. 10, support 84 and base 82 extend in an identical direction with respect to column 83. Hence, support 84 faces base 82.

Figure 11:
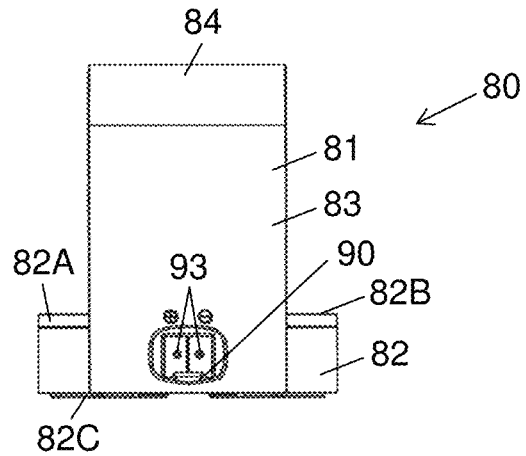
FIG. 11 is a back view of the charging stand of the electric apparatus unit according to the exemplary embodiment of the present invention.

Base 82 has a substantially circular shape when seen from a plan view seen from above. As illustrated in FIG. 11, base 82 includes top panel 82A and bottom plate 82C.

Top surface 82B of base 82 formed by top panel 82A of base 82 has a flat shape. Consequently, the user can easily wipe out stains on top surface 82B.

In this regard, top panel 82A can be detachably attached to base 82. In this case, top panel 82A can be washed with water by detaching top panel 82A.

Figure 13:
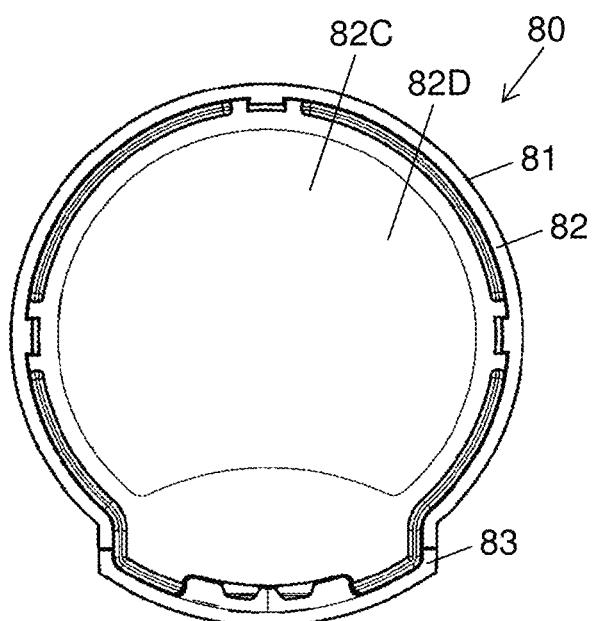
FIG. 13 is a bottom view of the charging stand of the electric apparatus unit according to the exemplary embodiment of the present invention.

As illustrated in FIG. 13, bottom surface 82D formed by bottom plate 82C of base 82 has a flat shape. Consequently, charging stand 80 can stably stand without falling in various directions.

Figure 12:
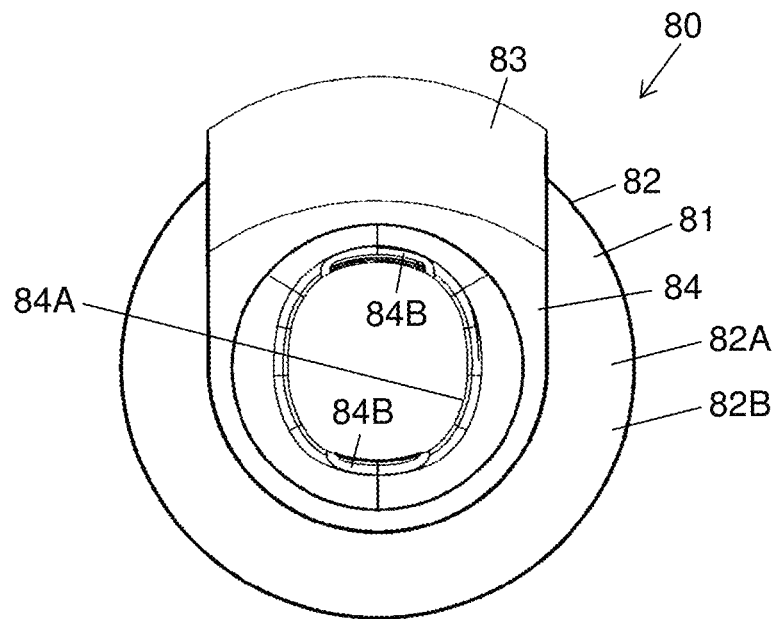
FIG. 12 is a plan view of the charging stand of the electric apparatus unit according to the exemplary embodiment of the present invention.

As illustrated in FIG. 12, hole 84A which extends in a height direction is formed in support 84. Support 84 has an annular shape in which main body 20 (see FIG. 1) can be inserted. Hole 84A has an elliptical shape when seen from a plan view seen from above.

As illustrated in FIG. 14, a top surface of support 84 and an inner circumferential surface of hole 84A are integrally formed. According to such configuration, the top surface of support 84 and the inner circumferential surface of hole 84A hardly allow a liquid to enter inside support 84 compared to a case where the top surface of support 84 and the inner circumferential surface of hole 84A are formed by combining different members.

As illustrated in FIG. 19, an elliptical shape of hole 84A is similar to the elliptical shape of grip 22. An inner diameter of hole 84A is slightly larger than an outer diameter of supported portion 23 of grip 22 of main body 20. Consequently, supported portion 23 can be inserted into hole 84A. Since hole 84A and supported portion 23 have elliptical cross sections, rotation of main body 20 inside hole 84A can be suppressed.

As illustrated in FIG. 14, an opening at an upper side of hole 84A has a moderately curved shape whose inner diameter of hole 84A expands upward. According to such configuration, when main body 20 (see FIG. 18) is inserted into hole 84A from above, bottom surface 27A (see FIG. 18) of main body 20 is guided inside hole 84A along the opening of hole 84A. In the opening of hole 84A, two recesses 84B are formed. Upper surfaces of recesses 84B have planar shapes orthogonal to the height direction.

Figure 18:
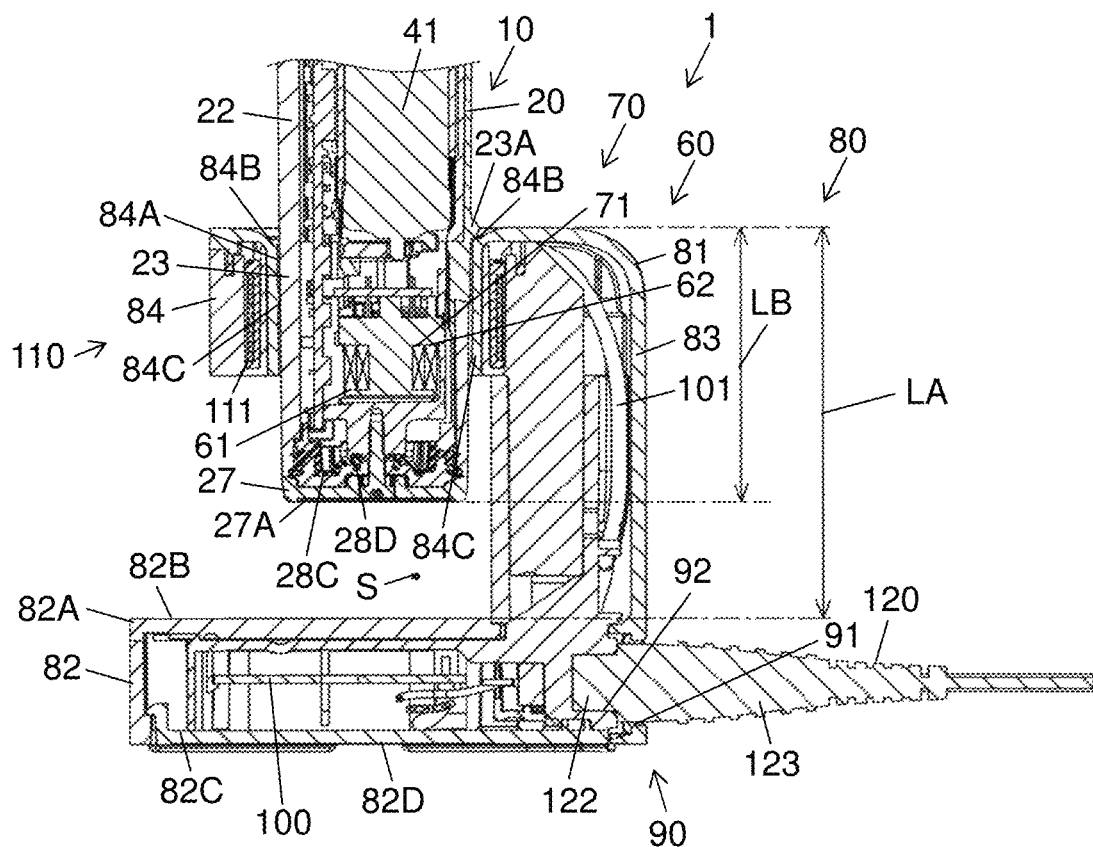
FIG. 18 is a cross-sectional view taken along line 18-18 in FIG. 2.

As illustrated in FIG. 18, protrusion 23A of main body 20 is caught by recesses 84B formed at a rim of the opening at the upper side of hole 84A of support 84. Distance LA from recesses 84B to top surface 82B of base 82 is longer than distance LB from protrusion 23A to bottom surface 27A formed by lower cap 27 of main body 20. According to such configuration, when main body 20 is inserted into hole 84A, gap S is formed between bottom surface 27A of main body 20 and top surface 82B of base 82. That is, main body 20 is supported on charging stand 80 in a state where bottom surface 27A floats above top surface 82B of base 82. A size of gap S (a height from top surface 82B) is, for example, 1 mm to 30 mm and is preferably approximately 16 mm.

In this regard, two recesses 84B are formed in the opening of hole 84A. Further, hole 84A has an elliptical shape. According to such configuration, main body 20 can be inserted into hole 84A at a position which is 180 degrees different in a circumferential direction with respect to charging stand 80. Further, the user can select one of two recesses 84B by which protrusion 23A is caught.

As illustrated in FIG. 14, two guides 84C which protrude toward a center axis of hole 84A are formed on an inner circumference of hole 84A. Two guides 84C are formed at opposite positions across the center axis of hole 84A. Two guides 84C are formed at different positions in an axial direction of hole 84A.

According to such configuration, when main body 20 (see FIG. 18) is inserted into hole 84A, two guides 84C keep an orientation of main body 20 (see FIG. 18) such that the height direction of main body 20 (see FIG. 18) is parallel to the axial direction of hole 84A.

Figure 15:
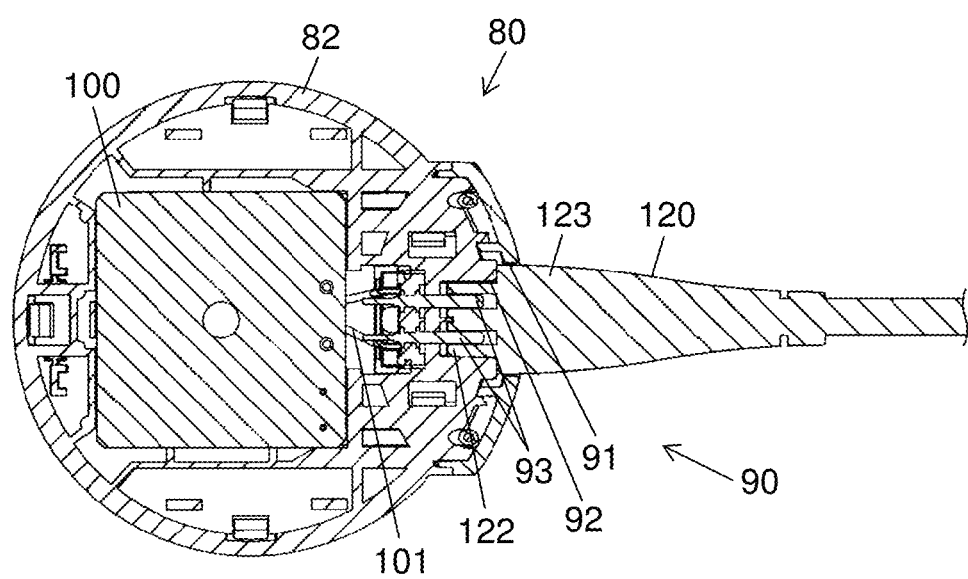
FIG. 15 is a cross-sectional view taken along line 15-15 in FIG. 10.

As illustrated in FIG. 15, connection portion 90 is formed at a lower portion of column 83 and at a side opposite to base 82. Connection portion 90 includes a recess. Terminal 93 is provided inside connection portion 90, and terminal 93 is connected with a terminal (not illustrated) of power line 120. Thus, power from power line 120 is supplied to power transmitting device 110.

Connection portion 90 includes a step structure which is a waterproof structure. For example, connection portion 90 includes large diameter portion 91 on a top surface side of case 81, and small diameter portion 92 depth-ward with respect to large diameter portion 91. A portion of power line 120 inserted into connection portion 90 includes small diameter portion 122 which is a distal end portion, and large diameter portion 123 which continues to small diameter portion 122. When power line 120 is connected to connection portion 90, small diameter portion 122 is inserted into small diameter portion 92, and large diameter portion 123 is inserted into large diameter portion 91.

Connection portion 90 is formed such that a gap (e.g., 0 mm to 0.4 mm) formed between large diameter portion 123 and large diameter portion 91 is smaller than a gap (e.g., 1 mm or more) formed between small diameter portion 122 and small diameter portion 92. Thus, the waterproof structure of connection portion 90 is formed.

According to such configuration, more water entering inside connection portion 90 is stored at large diameter portion 91 than at small diameter portion 92 due to a capillary phenomenon. Consequently, adhesion of water to terminal 93 can be suppressed.

Figure 16:
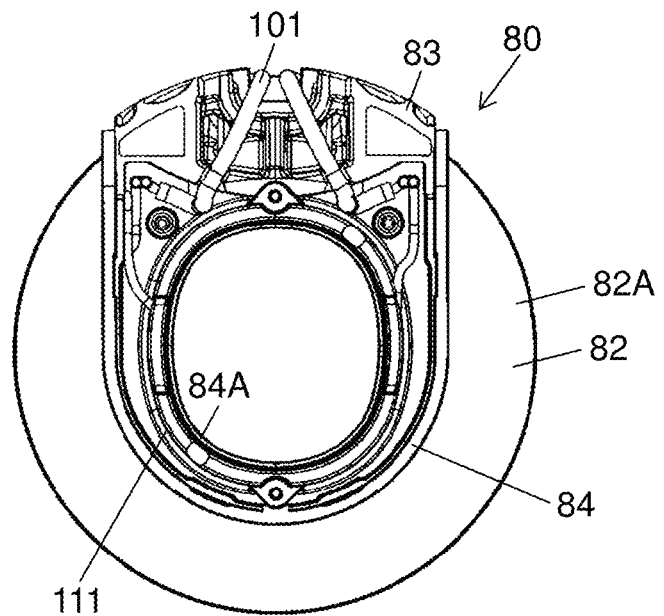
FIG. 16 is a plan view of the charging stand from which a top surface of a support of the charging stand of the electric apparatus unit according to the exemplary embodiment of the present invention illustrated in FIG. 9 is detached.

Substrate 100 is disposed inside base 82. As illustrated in FIG. 16, power transmission coil 111 which is the primary power supply unit of power transmitting device 110 is disposed on support 84.

Figure 17:
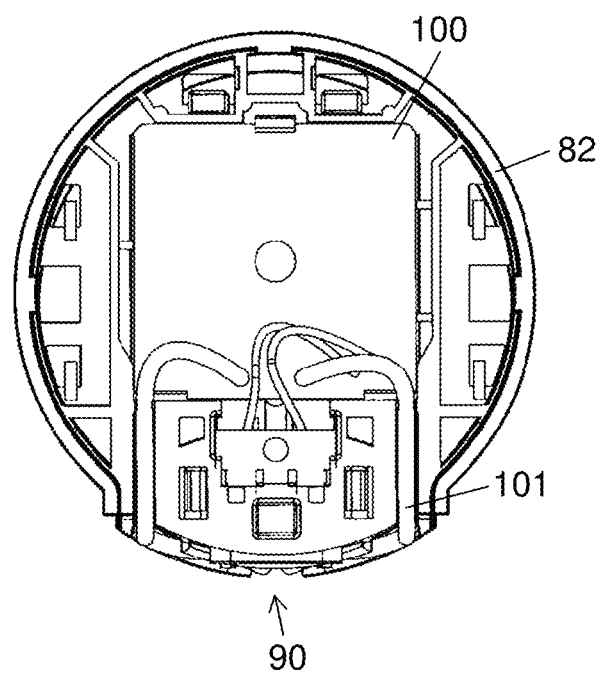
FIG. 17 is a bottom view of the charging stand of the electric apparatus unit according to the exemplary embodiment of the present invention illustrated in FIG. 9 with a bottom plate of a base of the charging stand being detached.

As illustrated in FIG. 17, elements of substrate 100 and power transmission coil 111 are connected by lead 101 which passes inside column 83.

Figure 20:
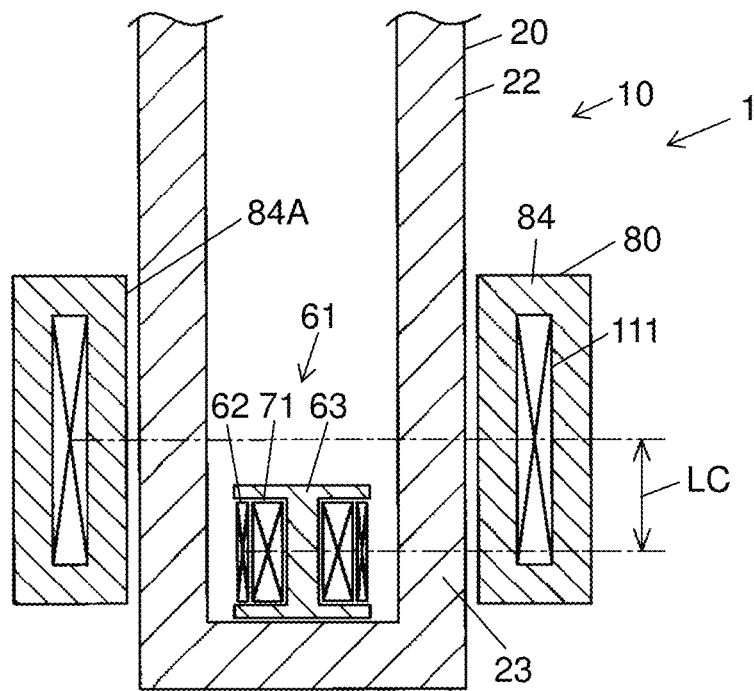
FIG. 20 is a schematic view illustrating a positional relationship between a power transmission coil and a power receiver of the electric apparatus unit according to the exemplary embodiment of the present invention illustrated in FIG. 18.

Next, a positional relationship between power transmission coil 111 and power receiver 61 will be described with reference to FIG. 20.

In a state where main body 20 is supported on charging stand 80, a center of an axial direction of power transmission coil 111 and a center of an axial direction of magnetism collection coil 71 of power receiver 61 are misaligned. That is, in an axial direction of charging stand 80, a center of magnetism collection coil 71 is positioned below a center of power transmission coil 111 and an upper end of magnetism collection coil 71 is positioned above a lower end of power transmission coil 111.

That is, in the axial direction of charging stand 80, magnetism collection coil 71 and power transmission coil 111 are disposed partially overlapping each other. Distance LC between the center of the axial direction of power transmission coil 111 and the center of the axial direction of magnetism collection coil 71 of power receiver 61 is preferably half or less than a length of the axial direction of power transmission coil 111.

Next, circuit configurations of power transmitting device 110 and power receiving device 60 will be described with reference to FIGS. 21 and 22.

Power transmitting device 110 is connected to alternating current power supply AC via power line 120 and connection portion 90. Power line 120 includes power circuit 121 which converts alternating current power of alternating current power supply AC into direct current power.

Power transmitting device 110 includes power transmission coil 111, first switching element 112A, second switching element 112B, capacitors 113A, 113B, first drive circuit 114A, second drive circuit 114B, power transmission controller 115, power transmission resonant capacitor 116, current detection circuit 117 and voltage detection circuit 118.

Switching elements 112A, 112B, capacitors 113A, 113B, drive circuits 114A, 114B, power transmission controller 115, power transmission resonant capacitor 116, current detection circuit 117, and voltage detection circuit 118 are mounted on substrate 100 (see FIG. 14).

First switching element 112A and second switching element 112B supply a direct current generated by power circuit 121 to power transmission coil 111. First switching element 112A and second switching element 112B are connected with each other in series.

For example, field effect transistors (FETs) are used for first switching element 112A and second switching element 112B. In this case, one of first switching element 112A and second switching element 112B is an N channel FET, and other one is a P channel FET.

Two switching elements 112A, 112B configure a half-bridge circuit. Two switching elements 112A, 112B are connected with capacitors 113A, 113B. Capacitors 113A, 113B have the same capacitance in the present exemplary embodiment.

First switching element 112A is connected with first drive circuit 114A. Second switching element 112B is connected with second drive circuit 114B.

Power transmission controller 115 controls power supplied from each of drive circuits 114A, 114B to each of switching elements 112A, 112B. Power transmission controller 115 outputs a pulse width modulation (PWM) command signal to each of drive circuits 114A, 114B. Each of drive circuits 114A, 114B supplies power based on the input PWM signal to each of switching elements 112A, 112B. The power supplied to each of switching elements 112A, 112B causes each of switching elements 112A, 112B to repeatedly switch to on and off to generate an alternating current from a direct current.

Power transmission resonant capacitor 116 is connected in series with switching elements 112A, 112B and power transmission coil 111 between switching elements 112A, 112B and power transmission coil 111. Power transmission resonant capacitor 116 and power transmission coil 111 configure a power transmission resonant circuit. Power transmission resonance frequencies of power transmission resonant capacitor 116 and power transmission coil 111 are set smaller than an operating frequency of power supplied to switching elements 112A, 112B.

Current detection circuit 117 includes resistance 117A which is connected with a ground side of power transmitting device 110 and detects an input current, and amplifier circuit 117B which amplifies voltages produced at both ends of resistance 117A. Amplifier circuit 117B converts a magnitude of the current into a voltage, and outputs the voltage to power transmission controller 115.

Voltage detection circuit 118 which detects resonant voltage V that is a voltage of a power transmission resonant circuit and is configured by two resistances is connected between power transmission resonant capacitor 116 and power transmission coil 111. Voltage detection circuit 118 outputs resonant voltage V to power transmission controller 115.

Figure 22:
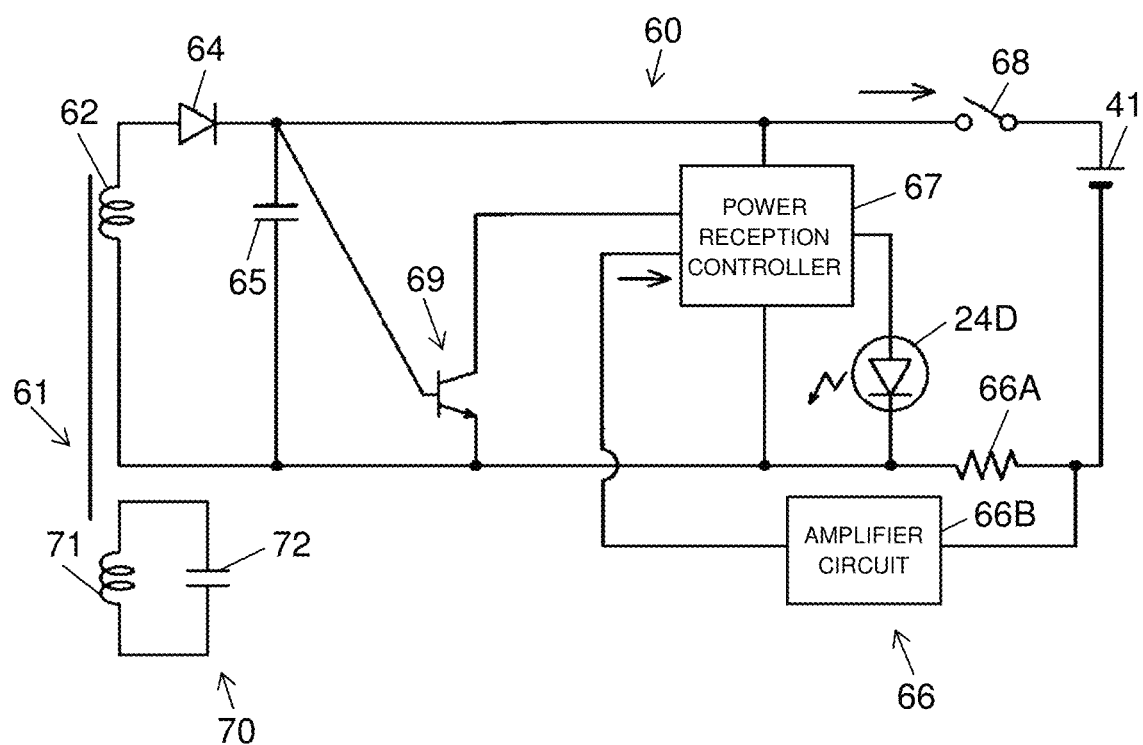
FIG. 22 is a block diagram of a magnetism collecting device and a power receiving device of the electric apparatus unit according to the exemplary embodiment of the present invention.

As illustrated in FIG. 22, magnetism collecting device 70 includes magnetism collection coil 71 and magnetism collection resonant capacitor 72. Magnetism collection resonant capacitor 72 is mounted on substrate 50.

Power receiving device 60 includes power reception coil 62 which magnetically couples to magnetism collection coil 71, diode 64, smoothing capacitor 65, current detection circuit 66, power reception controller 67, switch 68, timing detection circuit 69, and charging display 24D.

Diode 64, smoothing capacitor 65, current detection circuit 66, power reception controller 67, switch 68, and timing detection circuit 69 are mounted on substrate 50 (see FIG. 8).

Figure 21:
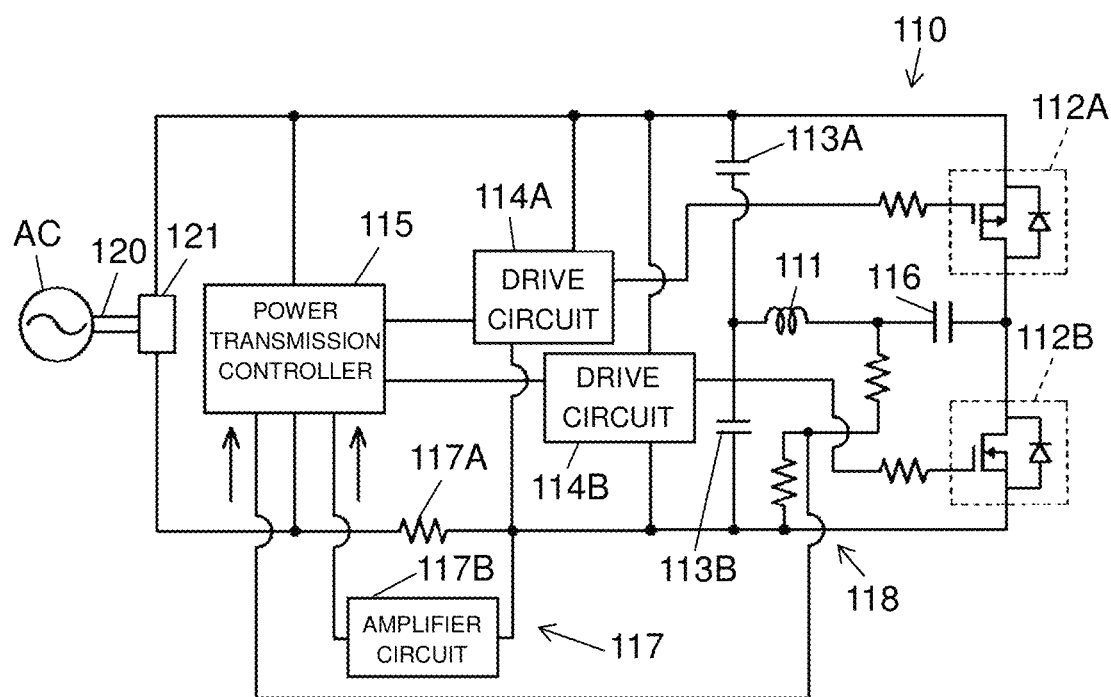
FIG. 21 is a block diagram of a power transmitting device of the electric apparatus unit according to the exemplary embodiment of the present invention.

An alternating magnetic flux produced from power transmission coil 111 illustrated in FIG. 21 interlinks with magnetism collection coil 71 illustrated in FIG. 22, and transmits power to magnetism collection coil 71 by way of magnetic resonance. The power transmitted to magnetism collection coil 71 is transmitted to power reception coil 62, and causes power reception coil 62 to produce alternating power.

That is, power transmission coil 111 (see FIG. 21) transmits the power to power reception coil 62. Power transmission coil 111 (see FIG. 21) and power receiver 61 configure the non-contact power transmitter. The alternating power produced by power reception coil 62 is converted from an alternating current into a direct current by diode 64.

Diode 64 is connected with smoothing capacitor 65 that reduces noise of the direct current converted by diode 64, and rechargeable battery 41 that is a load to which the direct current converted by diode 64 is supplied. Switch 68 is disposed between diode 64 and rechargeable battery 41.

Current detection circuit 66 includes resistance 66A that is connected to a ground side of power receiving device 60 and detects an input current, and amplifier circuit 66B that amplifies voltages produced at both ends of resistance 66A. Amplifier circuit 66B converts a magnitude of a current into a voltage, and outputs the voltage to power reception controller 67.

Power reception controller 67 switches switch 68 to on and off. That is, power reception controller 67 switches whether or not to execute power supply to rechargeable battery 41. Power reception controller 67 switches switch 68 to on when a voltage of rechargeable battery 41 changes from a predetermined voltage or more to a voltage less than the predetermined voltage. Further, power reception controller 67 switches switch 68 to off when the voltage of rechargeable battery 41 changes from a voltage less than the predetermined voltage to the predetermined voltage or more.

Power reception controller 67 switches an indication of charging display 24D. Power reception controller 67 causes charging display 24D to light up while rechargeable battery 41 is charged, and does not cause charging display 24D to light up while rechargeable battery 41 is not charged.

Power reception controller 67 communicates with power transmission controller 115 (see FIG. 21) by switching switch 68 to on and off. Power transmission controller 115 (see FIG. 21) causes voltage detection circuit 118 (see FIG. 21) to detect resonant voltage V which changes when power reception controller 67 switches switch 68.

Timing detection circuit 69 detects whether there is a waveform of the alternating power generated by power reception coil 62 in a predetermined period. The waveform detected by timing detection circuit 69 correlates with an output of the alternating power supplied to power transmission coil 111 (see FIG. 21).

That is, timing detection circuit 69 detects the alternating power supplied to power transmission coil 111 (FIG. 21). Timing detection circuit 69 is configured by a transistor, for example.

When power reception coil 62 produces the alternating power, the voltage is continuously applied to power reception coil 62, and therefore the transistor continues an on state. Hence, timing detection circuit 69 outputs first timing signal SA to power reception controller 67.

On the other hand, when power reception coil 62 does not produce the alternating power, the transistor switches to an off state. Hence, timing detection circuit 69 outputs second timing signal SB to power reception controller 67.

Power reception controller 67 detects power transmitting device 110 (FIG. 21) based on timing signals SA, SB, and controls switch 68 and charging display 24D.

Next, a function of electric apparatus unit 1 will be described with reference to FIG. 18.

When charging stand 80 supports electric toothbrush 10, a space is formed below bottom surface 27A of electric toothbrush 10. Consequently, bottom surface 27A of electric toothbrush 10 can be placed in contact with outdoor air.

When magnetism collection coil 71 is disposed at a bottom of main body 20 and charging stand 80 supports electric toothbrush 10, the center of the axial direction of power transmission coil 111 and the center of the axial direction of magnetism collection coil 71 are misaligned. The center of the axial direction of power transmission coil 111 and the center of the axial direction of magnetism collection coil 71 are misaligned, so that a coupling coefficient of power transmission coil 111 and magnetism collection coil 71 becomes small.

Meanwhile, power transmission coil 111 is a hollow core and magnetism collection coil 71 is wound around magnetic body core 63. Therefore, as the center of magnetism collection coil 71 is misaligned farther from the center of power transmission coil 111 in the axial direction of power transmission coil 111, an inductance of power transmission coil 111 becomes smaller and a power transmission resonance frequency of power transmission coil 111 and power transmission resonant capacitor 116 (see FIG. 21) becomes larger.

The power transmission resonance frequency is set smaller than operating frequencies of switching elements 112A, 112B. Hence, as the center of magnetism collection coil 71 is misaligned farther from the center of power transmission coil 111, the power transmission resonance frequency becomes closer to the operating frequencies. When the power transmission resonance frequency is closer to the operating frequencies, the input current is higher. Consequently, the coupling coefficient of power transmission coil 111 and magnetism collection coil 71 becomes smaller, yet the input current can be increased. Consequently, a decrease in an output current can be suppressed.

Further, magnetic body core 63 has a bobbin shape, and therefore the alternating magnetic flux is likely to be collected by magnetic body core 63. Hence, a magnetic flux passing a core of the bobbin passes magnetic body core 63 and is bent at a guard, and easily returns to power transmission coil 111. Hence, leakage of the magnetic flux is reduced, and a coupling degree of the coupling coefficient of power transmission coil 111 and magnetism collection coil 71 increases. Consequently, a decrease in power transmission efficiency can be suppressed.

Electric apparatus unit 1 according to the present exemplary embodiment employing the above-described configuration provides a following effect.

In electric apparatus unit 1 according to the present exemplary embodiment, support 84 of charging stand 80 supports electric toothbrush 10. Therefore, the space is formed below bottom surface 27A of electric toothbrush 10. This makes it possible to easily evaporate moisture adhered to electric toothbrush 10 or base 82. Further, in a state where electric toothbrush 10 is supported on support 84 of charging stand 80, i.e., without detaching electric toothbrush 10 from the charging station, bottom surface 27A of electric toothbrush 10 and top surface 82B of base 82 can be cleaned.

In electric apparatus unit 1 according to the present exemplary embodiment, power transmission coil 111 and power reception coil 62 configure the non-contact power transmitter. Consequently, a concern about a decrease in charging efficiency can be reduced compared to a case where the primary power supply unit and the secondary power supply unit contact each other to configure a power supplying terminal.

In electric apparatus unit 1 according to the present exemplary embodiment, since power transmission coil 111 is disposed inside support 84, the space in the support is effectively used. Further, moisture and stains hardly adhere to power transmission coil 111.

In electric apparatus unit 1 according to the present exemplary embodiment, since power reception coil 62 is disposed inside electric toothbrush 10, moisture and stains hardly adhere to power reception coil 62. Further, since magnetism collection coil 71 is disposed inside electric toothbrush 10, moisture and stains hardly adhere to magnetism collection coil 71.

In electric apparatus unit 1 according to the present exemplary embodiment, power transmission coil 111 can be disposed at the entire circumference of support 84. According to such configuration, it is possible to efficiently interlink magnetic fluxes with power reception coil 62 and magnetism collection coil 71. Thus, transmission efficiency of power from power transmission coil 111 and magnetism collection coil 71 to power reception coil 62 can be increased.

Further, in electric apparatus unit 1 according to the present exemplary embodiment, power transmission coil 111 has the annular shape. Therefore, when the center of hole 84A and the center of main body 20 are misaligned, a maximum distance between magnetism collection coil 71 and power transmission coil 111 becomes long, and a minimum distance becomes short. Consequently, even when main body 20 is misaligned in the radial direction, a decrease in the power transmission efficiency can be suppressed.

In electric apparatus unit 1 according to the present exemplary embodiment, bottom surface 27A of electric toothbrush 10 floats above base 82. When power transmission coil 111 is disposed on base 82, the coupling coefficient of power transmission coil 111 and magnetism collection coil 71 becomes small, and the power transmission efficiency reduces. However, in electric apparatus unit 1 according to the present exemplary embodiment, power transmission coil 111 is disposed on support 84, and magnetism collection coil 71 is disposed on supported portion 23. Consequently, a decrease in the power transmission efficiency can be suppressed.

In electric apparatus unit 1 according to the present exemplary embodiment, support 84 adopts the structure in which a space in which the finger can be inserted is formed below bottom surface 27A of electric toothbrush 10 and in which electric toothbrush 10 is supported. Hence, in a state where electric toothbrush 10 is supported on charging stand 80, the user can easily clean bottom surface 27A of electric toothbrush 10 and top surface 82B of charging stand 80 which opposes to bottom surface 27A.

In electric apparatus unit 1 according to the present exemplary embodiment, protrusion 23A of electric toothbrush 10 is set in recesses 84B of support 84. According to such configuration, the orientation of electric toothbrush 10 supported by support 84 hardly changes. Further, protrusion 23A is fitted to recesses 84B, so that a positional relationship between main body 20 and support 84 in the height direction is hardly misaligned. Consequently, it is easy to maintain the size of the space between bottom surface 27A of main body and base 82. Further, the positional relationship between power transmission coil 111, power reception coil 62 and magnetism collection coil 71 in the height direction is hardly misaligned. This can prevent misalignment of the positional relationship between power transmission coil 111, power reception coil 62 and magnetism collection coil 71 in the height direction from decreasing the charging efficiency.

Further, electric apparatus unit 1 according to the present exemplary embodiment includes protrusion 23A formed in electric toothbrush 10 and recesses 84B formed on support 84, and therefore grip 22 of main body 20 is prevented from deeply fitting to hole 84A of support 84. Consequently, difficulty in removing main body 20 from hole 84A can be suppressed.

In electric apparatus unit 1 according to the present exemplary embodiment, protrusion 23A formed in electric toothbrush 10 is discontinuously formed in the circumferential direction of grip 22. Consequently, water is hardly stored at protrusion 23A compared to protrusion 23A formed at the entire circumference. Further, a step in the circumferential direction of grip 22 of protrusion 23A makes main body 20 hardly rotate when main body 20 is laid and placed at a wash basin.

In electric apparatus unit 1 according to the present exemplary embodiment, two recesses 84B of support 84 are formed in the opening of hole 84A. According to such configuration, main body 20 can be inserted into hole 84A of charging stand 80 such that the front surface and the back surface of main body 20 oppose.

In electric apparatus unit 1 according to the present exemplary embodiment, guides 84C formed at the inner circumference of support 84 keep the orientation at which electric toothbrush 10 is placed on charging stand 80. Therefore, a fine external outlook can be improved. Further, guides 84C formed at the inner circumference of support 84 hardly misalign the positional relationship between power transmission coil 111, power reception coil 62 and magnetism collection coil 71. This can prevent the misalignment of the positional relationship between power transmission coil 111, power reception coil 62 and magnetism collection coil 71 from decreasing the charging efficiency.

In electric apparatus unit 1 according to the present exemplary embodiment, power line 120 is detachably provided on charging stand 80. Such configuration makes it possible to carry charging stand 80 and improve convenience.

In electric apparatus unit 1 according to the present exemplary embodiment, connection portion 90 adopts the waterproof structure formed by the step structure. Such configuration makes it possible to control the liquid which has flowed in connection portion 90. This makes it possible to prevent the liquid from adhering to terminal 93 which connects with power line 120. Consequently, a concern about leakage of electricity from connection portion 90 can be decreased.

MODIFIED EXAMPLES

The exemplary embodiment of the present invention described above includes following modified examples, too.

Modified Example 1

In electric apparatus unit 1 according to the present exemplary embodiment, a primary power supply unit and a secondary power supply unit are not limited to an aspect for configuring a non-contact power transmitter and can be also configured to supply power when there is a contact. In this case, for example, a terminal which is the primary power supply unit is provided at an inner circumference of hole 84A, and a terminal which is the secondary power supply unit is provided at an outer circumference of supported portion 23.

Modified Example 2

In electric apparatus unit 1 according to the present exemplary embodiment, at least one of protrusion 23A of electric toothbrush 10 and recesses 84B of support 84 may be omitted. In this case, too, electric toothbrush 10 can be supported such that a tapered shape of grip 22 of main body 20 forms a space between bottom surface 27A and base 82.

Modified Example 3

In electric apparatus unit 1 according to the present exemplary embodiment, support 84 of charging stand 80 may have a U shape when seen from a plan view seen from above. That is, support 84 may have such a shape that electric toothbrush 10 can be supported with space being formed between bottom surface 27A of electric toothbrush 10 and base 82.

Modified Example 4

In electric apparatus unit 1 according to the present exemplary embodiment, power transmission coil 111 can be disposed on base 82, too.

Modified Example 5

In electric apparatus unit 1 according to the present exemplary embodiment, power transmission coil 111 is disposed inside support 84, and can be also disposed to have a U shape when seen from a plan view seen from above.

Modified Example 6

In electric apparatus unit 1 according to the present exemplary embodiment, power receiver 61 can be disposed at a different portion inside main body 20 from supported portion 23.

Modified Example 7

In electric apparatus unit 1 according to the present exemplary embodiment, grip 22 may have a cylindrical shape which does not have a tapered shape. In this case, upper cap 26 and grip 22 may be integrally formed.

Modified Example 8

In electric apparatus unit 1 according to the present exemplary embodiment, lower cap 27 and grip 22 may be integrally formed.

Modified Example 9

In electric apparatus unit 1 according to the present exemplary embodiment, column 83 can be provided with a groove, a hole or a rib, too, which functions as a waterproof structure at an upper side of connection portion 90. Consequently, a liquid adhering to column 83 flows in the groove or the hole or is dammed back by the rib. That is, this waterproof structure can control a liquid flow and prevent the liquid from entering inside connection portion 90.

Modified Example 10

In electric apparatus unit 1 according to the present exemplary embodiment, base 82 may be disposed protruding from column 83 in a direction different from support 84. In this case, too, a space is formed between bottom surface 27A of electric toothbrush 10 and a surface of furniture or the like on which base 82 is installed.

Modified Example 11

In electric apparatus unit 1 according to the present exemplary embodiment, magnetism collecting device 70 may be disposed on charging stand 80.

Modified Example 12

In electric apparatus unit 1 according to the present exemplary embodiment, magnetism collecting device 70 may be omitted. In this case, instead of magnetism collection resonant capacitor 72, a power reception resonant capacitor is connected to power reception coil 62, and power reception coil 62 and the power reception resonant capacitor configure a resonant circuit.

Modified Example 13

In electric apparatus unit 1 according to the present exemplary embodiment, power transmitting device 110 may be configured by a full-bridge circuit.

Modified Example 14

Electric apparatus unit 1 according to the present exemplary embodiment is applicable to an oral cleaner which is an oral hygiene device and ejects water to wash an oral cavity, or an electric apparatus unit which includes a stain cleaner which polishes teeth and removes stains, too.

Modified Example 15

Electric apparatus unit 1 according to the present exemplary embodiment is applicable to an electric apparatus unit which includes a shaver or a depilator which is a small electric apparatus.

As described above, electric apparatus unit 1 which is an example of the exemplary embodiment of the present invention includes: power device 10 that includes rechargeable battery 41, driver 30 that drives through power supplied from rechargeable battery 41, and secondary power supply unit 61 that supplies the power to rechargeable battery 41; and charging stand 80 which includes primary power supply unit 111 that supplies the power to secondary power supply unit 61, and support 84 that supports electric apparatus 10 so that a space is formed below a bottom surface of electric apparatus 10. According to such configuration, the space is formed below the bottom surface of electric apparatus 10 that is supported on charging stand 80. Unlike a case where the bottom surface of electric apparatus 10 is set on charging stand 80, the bottom surface of electric apparatus 10 contacts outdoor air. This makes it possible to easily evaporate moisture adhered to electric apparatus 10 or charging stand 80.

According to electric apparatus unit 1 which is the example of the exemplary embodiment of the present invention, primary power supply unit 111 and secondary power supply unit 61 may configure a non-contact power transmitter. According to such configuration, a contact failure of a terminal does not occur.

In electric apparatus unit 1 which is the example of the exemplary embodiment of the present invention, primary power supply unit 111 may be disposed inside support 84. According to such configuration, a space in support 84 is effectively used.

In electric apparatus unit 1 which is the example of the exemplary embodiment of the present invention, secondary power supply unit 61 may be disposed inside a portion facing support 84 in electric apparatus 10. According to such configuration, in a state where electric apparatus 10 is supported on charging stand 80, secondary power supply unit 61 is disposed near primary power supply unit 111. This makes it possible to increase transmission efficiency of electric power from primary power supply unit 111 to secondary power supply unit 61.

In electric apparatus unit 1 which is the example of the exemplary embodiment of the present invention, electric apparatus 10 may be formed in a columnar shape, support 84 may be formed in an annular shape in which electric apparatus 10 can be inserted, and a power transmission coil which configures primary power supply unit 111 may be disposed on support 84. According to such configuration, in a state where electric apparatus 10 is supported on charging stand 80, primary power supply unit 111 is disposed at the entire circumference of secondary power supply unit 61. This makes it possible to increase transmission efficiency of electric power from primary power supply unit 111 to secondary power supply unit 61.

In electric apparatus unit 1 which is the example of the exemplary embodiment of the present invention, support 84 may adopt a structure in which electric apparatus 10 is supported so that the space, in which a finger can be inserted, below the bottom surface of electric apparatus 10. According to such configuration, in a state where electric apparatus 10 is supported on charging stand 80, the user can easily clean the bottom surface of electric apparatus 10 and a surface of charging stand 80 which opposes to the bottom surface.

In electric apparatus unit 1 which is the example of the exemplary embodiment of the present invention, recesses 84B may be formed on support 84, and protrusion 23A having a shape meeting recesses 84B may be formed in electric apparatus 10, or a protrusion may be formed on support 84 and recesses having shapes meeting the protrusion may be formed in electric apparatus 10. According to such configuration, protrusion 23A of the electric apparatus is set or inserted into recesses 84B of support 84. Alternatively, the protrusion of support 84 is inserted into the recesses of electric apparatus 10. Hence, the orientation of electric apparatus 10 supported by support 84 becomes stable.

In electric apparatus unit 1 which is the example of the exemplary embodiment of the present invention, support 84 may include guides 84C which keep the orientation of electric apparatus 10 with respect to charging stand 80. According to such configuration, in a state where electric apparatus 10 is supported by charging stand 80, the orientation of electric apparatus 10 hardly changes with respect to support 84.

In electric apparatus unit 1 which is the example of the exemplary embodiment of the present invention, charging stand 80 may further include connection portion 90 to and from which power line 120 which supplies power to primary power supply unit 111 can be attached and detached. According to such configuration, in a state where, for example, power line 120 is detached from charging stand 80, charging stand 80 can be carried. Consequently, convenience is improved.

Electric apparatus unit 1 which is the example of the exemplary embodiment of the present invention, charging stand 80 may further adopt the waterproof structure which controls a liquid which has flowed in connection portion 90. Such configuration reduces a concern about leakage of electricity from connection portion 90.

In electric apparatus unit 1 which is the example of the exemplary embodiment of the present invention, electric apparatus 10 may be an oral hygiene device. According to such configuration, in the oral hygiene device to which a liquid readily adheres, moisture adhering to the oral hygiene device or charging stand 80 easily evaporates.

INDUSTRIAL APPLICABILITY

As described above, the present invention can provide an electric apparatus unit in which moisture adhering to electric apparatus or installation bases (charging stand) can easily evaporate. Consequently, the present invention can be used for various electric apparatus units which are used by households, medical facilities or equivalent environment.

REFERENCE MARKS IN THE DRAWINGS

1: electric apparatus unit
10: electric toothbrush (electric apparatus and oral hygiene device)
11: head
20: main body
21, 81: case
22: grip
23: supported portion
23A: protrusion
24: display
25: power button
26: upper cap
26A: top cap
26B: inner cap
26C: coupling portion
26D: hole
27: lower cap
27A: bottom surface
29: support body
29A: hook
30: driver
31: output shaft
40: power supply
41: rechargeable battery
50, 100: substrate
60: power receiving device
61: power receiver (secondary power supply unit)
62: power reception coil
70: magnetism collecting device
71: magnetism collection coil
72: magnetism collection resonant capacitor
80: charging stand
82: base
82A: top panel
82B: top surface
82C: bottom plate
82D: bottom surface
83: column
84: support
84A: hole
84B: recess
84C: guide
90: connection portion
91, 123: large diameter portion
92, 122: small diameter portion
101: lead
110: power transmitting device
111: power transmission coil (primary power supply unit)
120: power line

The invention claimed is:

1. An electric apparatus unit comprising:
an electric apparatus that includes
a rechargeable battery,
a driver that drives through power supplied from the rechargeable battery, and
a secondary power supply unit that supplies power to the rechargeable battery, wherein the electric apparatus having a bottom surface over which the rechargeable battery, the driver, and the secondary power supply unit are arranged; and
a charging stand that includes
a base,
a column extending upward from the base,
a primary power supply unit that supplies the power to the secondary power supply unit, and
a support that is attached to the column, and is in contact with a portion of the electric apparatus to hold the electric apparatus to maintain (1) the electric apparatus in an upright position, and (2) the bottom surface of the electric apparatus not contacting the base, wherein the portion of the electric apparatus contains the secondary power supply unit, and the support includes the primary power supply unit that faces the secondary power supply contained in the portion of the electric apparatus.

2. The electric apparatus unit according to claim 1, wherein the primary power supply unit and the secondary power supply unit configure a non-contact power transmitter.

3. The electric apparatus unit according to claim 1, wherein the primary power supply unit is disposed inside the support.

4. The electric apparatus unit according to claim 1, wherein
the electric apparatus is formed in a columnar shape,
the support is formed in an annular shape in which the electric apparatus can be inserted, and
a power transmission coil that configures the primary power supply unit is disposed in the support.

5. The electric apparatus unit according to claim 1, wherein the support maintains a space between the bottom surface and the base, the space being so formed to allow a finger to be inserted below the bottom surface of the electric apparatus.

6. The electric apparatus unit according to claim 1, wherein a recess is formed on the support, and a protrusion having a shape meeting the recess is formed in the electric apparatus, or a protrusion is formed on the support and a recess having a shape meeting the protrusion is formed in the electric apparatus.

7. The electric apparatus unit according to claim 1, wherein the support includes a guide that keeps an orientation of the electric apparatus with respect to the charging stand.

8. The electric apparatus unit according to claim 1, wherein the charging stand further includes a connection portion to and from which a power line that supplies the power to the primary power supply unit is attachable and detachable.

9. The electric apparatus unit according to claim 8, wherein the charging stand further includes a waterproof structure that controls a liquid flowing in the connection portion.

10. The electric apparatus unit according to claim 1, wherein the electric apparatus is an oral hygiene device.

11. The electric apparats unit according to claim 1, wherein the support is in contact only with the portion of the electric apparatus to hold the electric apparatus.

* * * * *